(12) United States Patent
Hao et al.

(10) Patent No.: US 10,198,158 B2
(45) Date of Patent: Feb. 5, 2019

(54) MAP WITH DIFFERENT DEGREES OF OVERLAPPING GEOCODED PIXELS

(71) Applicant: Hewlett-Packard Development Company, L.P., Houston, TX (US)

(72) Inventors: Ming C Hao, Palo Alto, CA (US); Halldor Janetzko, Haupstrass (DE); Umeshwar Dayal, Saratoga, CA (US); Meichun Hsu, Los Altos Hills, CA (US)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 268 days.

(21) Appl. No.: 14/904,751

(22) PCT Filed: Jul. 19, 2013

(86) PCT No.: PCT/US2013/051328
§ 371 (c)(1),
(2) Date: Jan. 13, 2016

(87) PCT Pub. No.: WO2015/009319
PCT Pub. Date: Jan. 22, 2015

(65) Prior Publication Data
US 2016/0170611 A1    Jun. 16, 2016

(51) Int. Cl.
*G06T 11/20*    (2006.01)
*G09B 29/00*    (2006.01)
(Continued)

(52) U.S. Cl.
CPC ........ *G06F 3/04842* (2013.01); *G06F 3/0481* (2013.01); *G06T 11/206* (2013.01); *G09B 29/007* (2013.01)

(58) Field of Classification Search
None
See application file for complete search history.

(56) References Cited

U.S. PATENT DOCUMENTS

| 7,873,240 B2 | 1/2011 | Oldroyd |
| 8,315,203 B2 | 11/2012 | Ashley et al. |
| (Continued) | | |

FOREIGN PATENT DOCUMENTS

| CN | 103036954 A | 4/2013 |
| CN | 103208227 A | 7/2013 |
| WO | WO-2003027154 | 3/2008 |

OTHER PUBLICATIONS

Kimler, M.; "Geo-coding: Recognition of Geographical References in Unstructured Text, and Their Visualisation": Aug. 23, 2004.

*Primary Examiner* — Kee M Tung
*Assistant Examiner* — Yanna Wu

(57) ABSTRACT

A pattern of geocoded pixels is generated by accessing data point values, where each data point value includes an attribute value and coordinates of a geographic location. Each data point value corresponds to a geocoded pixel that is positioned on the pattern based on the coordinates of the data point value such some geocoded pixels overlap other geocoded pixels. Different levels of the pattern of geocoded pixels correspond to a different degree of overlap between the geocoded pixels. The different levels of the pattern of geocoded pixels are associated with different magnification levels of a geographic map such that changing a magnification level of the geographic map causes a degree of overlap between the geocoded pixels of the pattern to change.

19 Claims, 8 Drawing Sheets

(51) Int. Cl.
*G06F 3/0481* (2013.01)
*G06F 3/0484* (2013.01)

(56) References Cited

U.S. PATENT DOCUMENTS

| | | |
|---|---|---|
| 8,331,611 B2 | 12/2012 | Johnson et al. |
| 2009/0055719 A1 | 2/2009 | Cossins et al. |
| 2009/0079766 A1* | 3/2009 | Dolph ................ G06F 3/04817 345/660 |
| 2009/0132469 A1 | 5/2009 | White et al. |
| 2009/0319556 A1 | 12/2009 | Stolte et al. |
| 2009/0319891 A1* | 12/2009 | MacKinlay ............. G06T 11/00 715/275 |
| 2011/0161320 A1 | 6/2011 | Golden et al. |
| 2012/0075337 A1* | 3/2012 | Rasmussen ............ G01C 21/32 345/629 |
| 2012/0221595 A1* | 8/2012 | Slowe .................... G06Q 10/02 707/769 |

\* cited by examiner

MAP WITH DIFFERENT DEGREES OF OVERLAPPING GEOCODED PIXELS

BACKGROUND

Geocoding is a process of identifying geographic coordinates from other geographic data such as street addresses or zip codes. When the geographic coordinates of physical data points (e.g., home addresses) are known, various attributes of each data point may be displayed on a geographic map that contains the data points. A display of geographic patterns of an attribute may reveal regional variations of the attribute.

BRIEF DESCRIPTION OF THE DRAWINGS

The following detailed description references the drawings, wherein.

DETAILED DESCRIPTION

Figure 1:
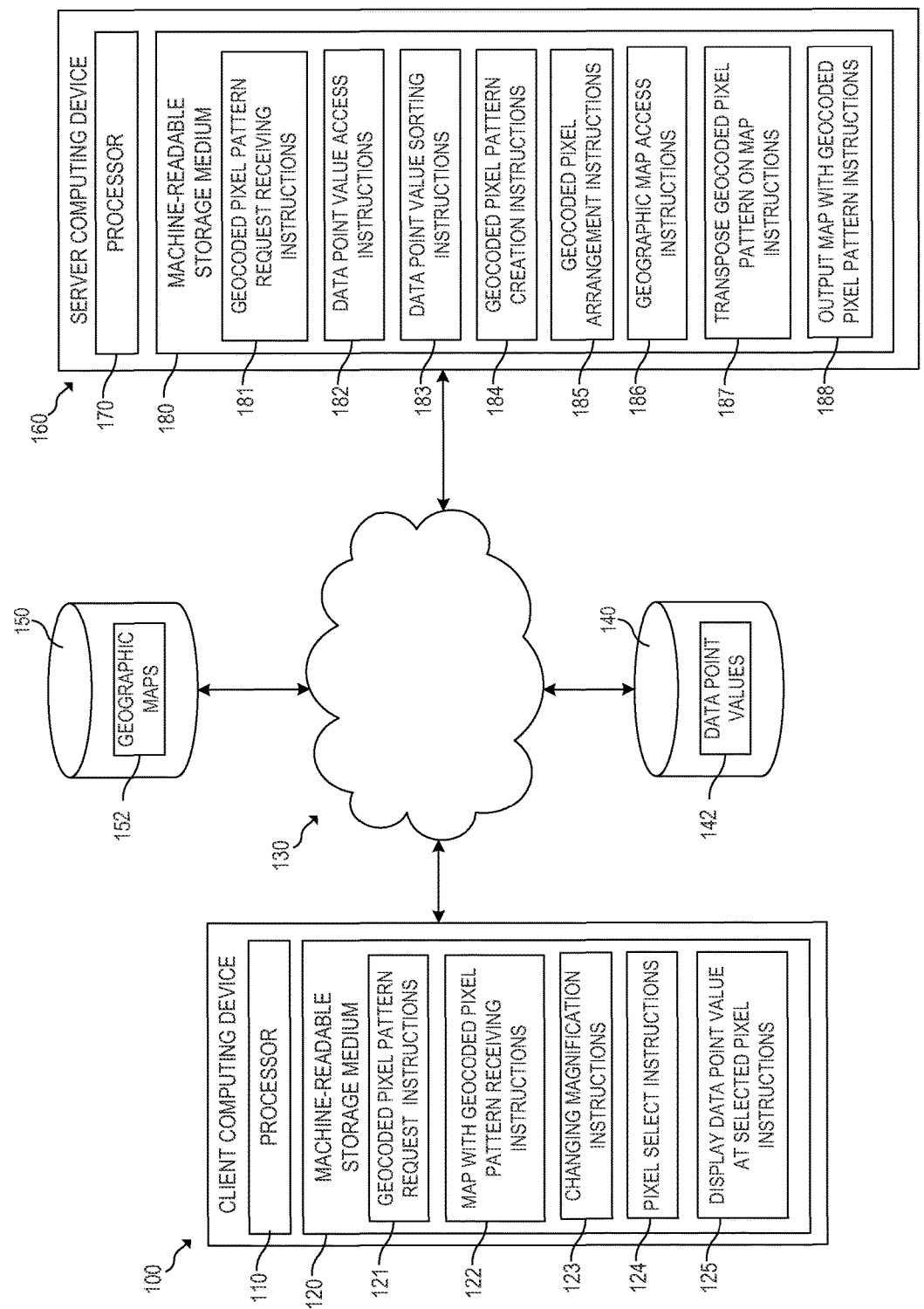
FIG. 1 is a block diagram of an example server computing device in communication via a network with a client computing device for generating a map including different degrees of overlapping patterns of geocoded pixels.

Geocoding patterns may be displayed for large geographic areas with aggregated data. A geocoded pattern may be displayed on a map of a country, and regions within the country may be identified using a color that corresponds to a value of an attribute. For example, a national health organization may geocode disease patterns by aggregating disease incidence and mortality rates by country. A mortality rate may be represented on a map by providing each county with a visual indicator such as a color. Lightly-colored counties may correspond to lower mortality rates and darkly-colored counties may correspond to higher mortality rates. Such low resolution of aggregated data may cause revealing individual patient information to be overlooked such that unusual patterns may not be discovered after the data is aggregated and the color coding is applied to a map. Accordingly, health care professionals may be unable to identify patterns of unusually high death rates at specific areas within a region.

Example embodiments disclosed herein address these issues by providing a pixel-based, high resolution technique for visualizing geocoded patterns of large, high density geographical data. High resolution geocoding visualization may be provided using data point values corresponding to individual pixels to construct a geocoded pattern of pixels. Each data point value may include an identification of coordinates for a location and a value of an attribute provided at the location.

Overlapping geocoded pixels may correspond to data point values having identical or similar location coordinates. The overlapping geocoded pixels may be sorted by attribute value in a list in ascending or descending order. The coordinates of the geocoded pixel that corresponds to the first attribute value in the sorted list may be identified as central coordinates. The remaining pixels in the sorted list may be concentrically repositioned in order around the central coordinates.

The resulting pattern of geocoded pixels includes geocoded pixels that extend outward from the central coordinates in order according to the sorted list of attribute values. The geocoded pixels may be arranged such that pixels having similar attribute values may be positioned proximate each other on the geocoded pattern. By repositioning the geocoded pixels in the pattern, the pixels that correspond to attribute values further down the sorted list may be repositioned at locations in the pattern that are further away from the location identified by the coordinates of the pixel's data point value. Accordingly, the geocoded pixels form a geocoded pixel pattern that is more spread out over a geographic region than the corresponding overlapping pattern of geocoded pixels. The spread out pattern of geocoded pixels may be provided on a geographic map to provide geographic context to the pattern of geocoded pixels. A user may then change magnification of the geographic map to observe different degrees of overlapping patterns of geocoded pixels. When the geographic map is displayed at full magnification, the geocoded pixels are displayed in a non-overlapping pattern such that a user may analyze the attribute values at the individual pixel level.

Referring now to the drawings, FIG. 1 is a block diagram of an example server computing device 160 in communication via a network 130 with a client computing device 100. As illustrated in FIG. 1 and described below, server computing device 160 may communicate with client computing device 100 to provide different degrees of overlapping patterns of geocoded pixels synchronized with different magnification levels of a geographic map.

Server computing device 160 may be any computing device accessible to a client device, such as client computing device 100, over network 130. Example networks include the Internet, a local area network (LAN), and a wide area network (WAN). In the embodiment of FIG. 1, server computing device 160 includes a processor 170 and a machine-readable storage medium 180.

Processor 170 may be one or more central processing units (CPUs), microprocessors, and/or other hardware devices suitable for retrieval and execution of instructions stored in machine-readable storage medium 180. Processor 170 may fetch, decode, and execute instructions 181, 182, 183, 184, 185, 186, 187, 188 to provide different degrees of overlapping patterns of geocoded pixels synchronized with different magnification levels of a geographic map, as described below. As an alternative or in addition to retrieving and executing instructions, processor 170 may include one or more electronic circuits comprising a number of electronic components for performing the functionality of one or more of instructions 181-188.

Machine-readable storage medium 180 may be any electronic, magnetic, optical, or other physical storage device that stores executable instructions. Thus, machine-readable storage medium 180 may be, for example, Random Access Memory (RAM), an Electrically-Erasable Programmable Read-Only Memory (EEPROM), a storage drive, an optical disc, and the like. As described in detail below, machine-readable storage medium 180 may be encoded with executable instructions 181-188 for providing different degrees of overlapping patterns of geocoded pixels synchronized with different magnification levels of a geographic map.

Client computing device 100 may be, for example, a notebook computer, a desktop computer, an all-in-one system, a thin client, a workstation, a tablet computing device, a mobile phone, or any other computing device suitable for execution of the functionality described below. In FIG. 1, client computing device 100 includes processor 110 and machine-readable storage medium 120.

As with processor 170 of server computing device 160, processor 110 may be one or more CPUs, microprocessors, and/or other hardware devices suitable for retrieval and execution of instructions 121, 122, 123, 124, 125. Processor 110 may fetch, decode, and execute instructions to interact with different magnification levels of a map that are synchronized with different degrees of overlapping patterns of geocoded pixels. Processor 110 may also or instead include electronic circuitry for performing the functionality of one or more instructions 121-125. As with storage medium 180 of server computing device 160, machine-readable storage medium 120 may be any physical storage device that stores executable instructions.

Communication may be established between client computing device 100 and server computing device 160. For example, client computing device 100 may access server computing device 160 at a predetermined Uniform Resource Locator (URL) and, in response, server computing device 160 may establish a communication session with client computing device 100. In some implementations, client login credentials, such as a user identifier and a corresponding authentication parameter (e.g., a password), may be used to establish communication with server computing device 160.

Storage 140 and storage 150 may be accessible to client computing device 100 and server computing device 160 via network 130. Storage 140 may include data point values 142, and storage 150 may include geographic maps 152. Data point values 142 may include an identification of a geographic location and attributes associated with the location. Each data point value may include coordinates that identify a geographic location, such as longitudinal and lateral coordinates. The attributes may correspond to a characteristic of a population that may vary depending on geographic location. Example attributes may include annual household income, disease infection rates, mortality rates due to a disease, age, race, and ethnicity. In some implementations, the attributes may correspond to consumer trends. For example, an attribute may identify consumers of a particular product or service, or the attribute may identify consumers who may have responded to a customer survey. Geographic maps 152 may be any type of map that includes a region of interest corresponding to particular data point values. Geographic maps 152 may illustrate a continent, country, region of a country, state, city, town, or neighborhood.

Geocoded pixel pattern request instructions 121 may receive a request for a geocoded pixel pattern and output the request to server computing device 160. The request may be received as user input at client computing device 100, and the request may be sent to server computing device 160 over network 130. The user may send the request in order to obtain a map having magnification levels synchronized with a pattern of different degrees of overlapping geocoded pixels that may illustrate attributes associated with a geographic area. For example, a user may request a map to identify infection rates of a particular disease across the United States.

Geocoded pixel pattern request receiving instructions 181 may receive the request from client computing device 100 at server computing device 160 over network 130. Server computing device 160 may parse the request to identify the geographic region and attributes associated with the request. For example, the request may be parsed to identify the United States as the geographic region and infection rates of a particular disease as the attributes.

Data point value access instructions 182 may access data point values 142 from storage 140 over network 130. Data point values 142 may correspond to values for attributes that are to be provided for the pattern of geocoded pixels and location coordinates corresponding to each attribute. For example, the data point values 142 may correspond to infection rates of a particular disease across the United States. In this case, data point values 142 may be accessed from an organization that maintains statistics for infectious diseases, such as a network location associated with the Center for Disease Control and Prevention. Data point values 142 that are accessed may identify a particular location and whether a person at the location is infected with the particular disease. While FIG. 1 is described with reference to the occurrence of disease infection, data point values 142 may correspond to values for any attributes associated with a population that may vary over a geographic area.

Data point value sorting instructions 183 may sort the data point values in ascending or descending order. For example, the data point values may be sorted from the data point values that correspond to the highest rate of disease infection at a particular location to the data point values that correspond to the lowest rate of disease infection at the particular location. Data point value sorting instructions 183 may also assign a visual indicator to different ranges of the data point values. For example, a visual indicator may be a particular color such that very high rates of infection may be indicated by the color red, high rates of infection may be indicated by the color orange, medium rates of infection may be indicated by the color yellow, low rates of infection may be indicated by the color green, very low rates of infection may be indicated by the color blue, and no occurrences of infection may be indicated by the color purple.

Geocoded pixel pattern creation instructions 184 may generate a pattern of geocoded pixels using the accessed data point values with the corresponding visual indicators and the coordinates that identify a location associated with each data point value. Each geocoded pixel on the pattern may correspond to a data point value. The same coordinates on the pattern may correspond to locations where many different people reside, especially in densely populated urban areas. Since more than one data point value may correspond to the same coordinates, multiple visual indicators may be assigned to the same pixel on the pattern. Accordingly, some of the visual indicators may overlap other visual indicators on the pattern. For example, a single pixel on the pattern may correspond to a high rate of disease infection but this single pixel may be obscured due to a high concentration of pixels at the same location that correspond to a low rate of disease infection.

Figure 2:
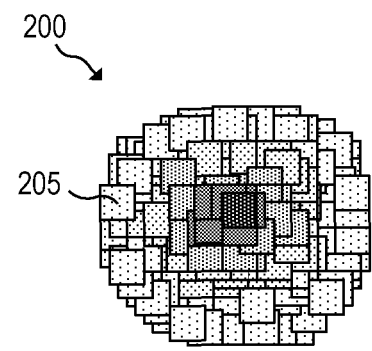
FIG. 2 illustrates an example of a pattern of overlapping geocoded pixels and an example of a pattern of repositioned geocoded pixels.
Figure 2:
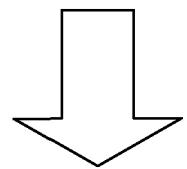
Figure 2:
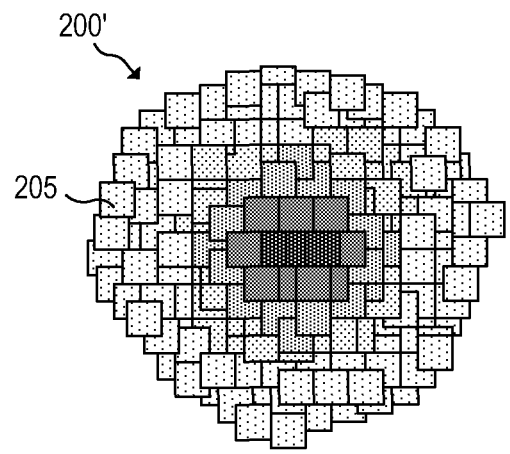

FIG. 2 illustrates a portion of a geocoded pixel pattern 200 that includes a set of individual geocoded pixels 205 where each pixel corresponds to a data point value. Some of the pixels may correspond to the same or similar coordinates such that the visual indicators on the pattern may overlap other visual indicators to form an overlapping geocoded pixel pattern. Each pixel may be assigned a visual indicator depending on the attribute value of the data point value associated with the geocoded pixel. For example, a high incidence of infection of a disease may be identified by a darkly colored visual indicator, while a low incidence of infection of disease may be identified by a lightly colored visual indicator.

In a densely populated area, many households may have the same residential address (e.g., an apartment building with many residential units), such that the data point values for each household at the same address include coordinates that are the same or are similar to each other. Accordingly, many of the pixels may overlap other pixels on the geocoded pixel pattern. The overlapping pattern of geocoded pixels may make it difficult for an analyzer of the geocoded pixel pattern to identify specific instances of high infection rates since a darkly visual indicator for a pixel may be obscured by an abundance of lightly colored visual indicators at or near the same coordinates. Accordingly, a high infection rate area may be overlooked.

Geocoded pixel arrangement instructions 185 may cause the overlapping pattern of the geocoded pixels to be arranged into a pattern having geocoded pixels with a smaller degree of overlap. The data point values are sorted in a list according to the attribute value of each data point. In some implementations, as stated above, the data point values may be sorted in descending order of attribute values. The data point value having the highest attribute value may be assigned to coordinates that correspond to the coordinates of that data point value. In other words, the geographic location for the data point value having the highest attribute value may be preserved such that the position of the corresponding geocoded pixel remains unchanged. The coordinates of the geocoded pixel associated with the highest attribute value may be identified as a central coordinate.

Moving down the sorted list of attribute values, the geocoded pixels associated with the remaining data point values may be assigned to positions on the pattern around the central coordinate in a concentric fashion. Accordingly, the geocoded pixels corresponding to the remaining attribute values in the sorted list are spread out in a pattern 200' having a smaller degree of overlap between adjacent geocoded pixels, as shown in the lower portion of FIG. 2. Since the visual indicators of the geocoded pixels correspond to a range of attribute values, the darker colored pixels are provided near the center of the non-overlapping pattern (i.e., close to the central coordinate), and the lighter colored pixels are provided along an edge of the non-overlapping pattern. By repositioning the geocoded pixels in the pattern 200', many of the pixels may not be provided at locations that correspond to the coordinates identified in the data point value for the pixel.

Geocoded pixel arrangement instructions 185 may generate different patterns of repositioned geocoded pixels having different degrees of overlapping geocoded pixels. Each pattern of repositioned geocoded pixels having a different degree of overlapping geocoded pixels may be associated with different magnification levels of a map such that when magnification of the map is increased, the degree of overlap between the repositioned geocoded pixels decreases. In some implementations, the maximum magnification level of the map corresponds to the minimum amount of overlap between the repositioned geocoded pixels. For example, at full magnification of a map, the repositioned geocoded pixels may be displayed with no overlap between the geocoded pixels.

Geographic map access instructions 186 may retrieve a geographic map 152 from storage 150 that corresponds to the same geographic area as the geocoded pixel pattern. For example, the geocoded pixel pattern may be created based on disease infection rates across the United States. In this case, a geographic map of the United States may be retrieved from storage 150. The map may be retrieved from a source of existing maps such that a new map need not be generated for the geographic area.

Transpose geocoded pixel pattern on map instructions 187 may provide the pattern of repositioned geocoded pixels on the retrieved geographic map. By providing the pattern of repositioned geocoded pixels on the geographic map, an analyzer of the attribute values may be provided with a reference to established geographic boundaries. Since the pattern of repositioned geocoded pixels includes pixels that are not assigned to the coordinates that correspond to the data point values, the geocoded pixels in the pattern may appear more spread out than in the original pattern of geocoded pixels. Accordingly, some of the pixels in the pattern of repositioned geocoded pixels may appear on the geographic map at uninhabitable locations (e.g., over a body of water).

Output map with geocoded pixel pattern instructions 188 may output the geographic map with the pattern of repositioned geocoded pixels to client computing device 100 over network 130. Map with geocoded pixel pattern receiving instructions 122 may receive the geographic map with the pattern of repositioned geocoded pixels from server computing device 160 over network 130.

Changing magnification instructions 123 may cause a magnification of the geographic map with the pattern of repositioned geocoded pixels to be increased or decreased. Different levels of the pattern of repositioned geocoded pixels are synchronized with magnification levels of the geographic map such that a change in the magnification level results in a change in the degree of overlap between the geocoded pixels. An analyzer of the attribute values may want to zoom-in to a specific region of the map to view the visual indicators at the specific region. For example, the visual indicators may identify a high incidence of disease infection in a particular region that the analyzer may want to investigate. In some implementations, the geographic map with the pattern of repositioned geocoded pixels may be magnified to a maximum level such that each individual pixel on the map corresponds to an individual data point value and there is no overlap between the geocoded pixels. At this level of focus, the analyzer may interact with individual visual indicators and attribute values provided on the geographic map with the non-overlapping pattern of geocoded pixels.

As a user changes a magnification level of the map, a degree of overlap between the geocoded pixels may also change due to the synchronization between the magnification levels and the different levels of the pattern of repositioned geocoded pixels. For example, as a user zooms-in on the map, the degree of the overlap between the geocoded pixels may decrease to reveal the geocoded pixels corresponding to a concentrated geographic region. Similarly, as a user zooms-out from the map, the degree of the overlap between the geocoded pixels may increase to reveal the geocoded pixels corresponding to a broader geographic area. Accordingly, the level of the pattern of geocoded pixels may change in response to changes to the magnification of the map, rather than in response to a specific, non-zooming action performed on the map.

Figure 3:
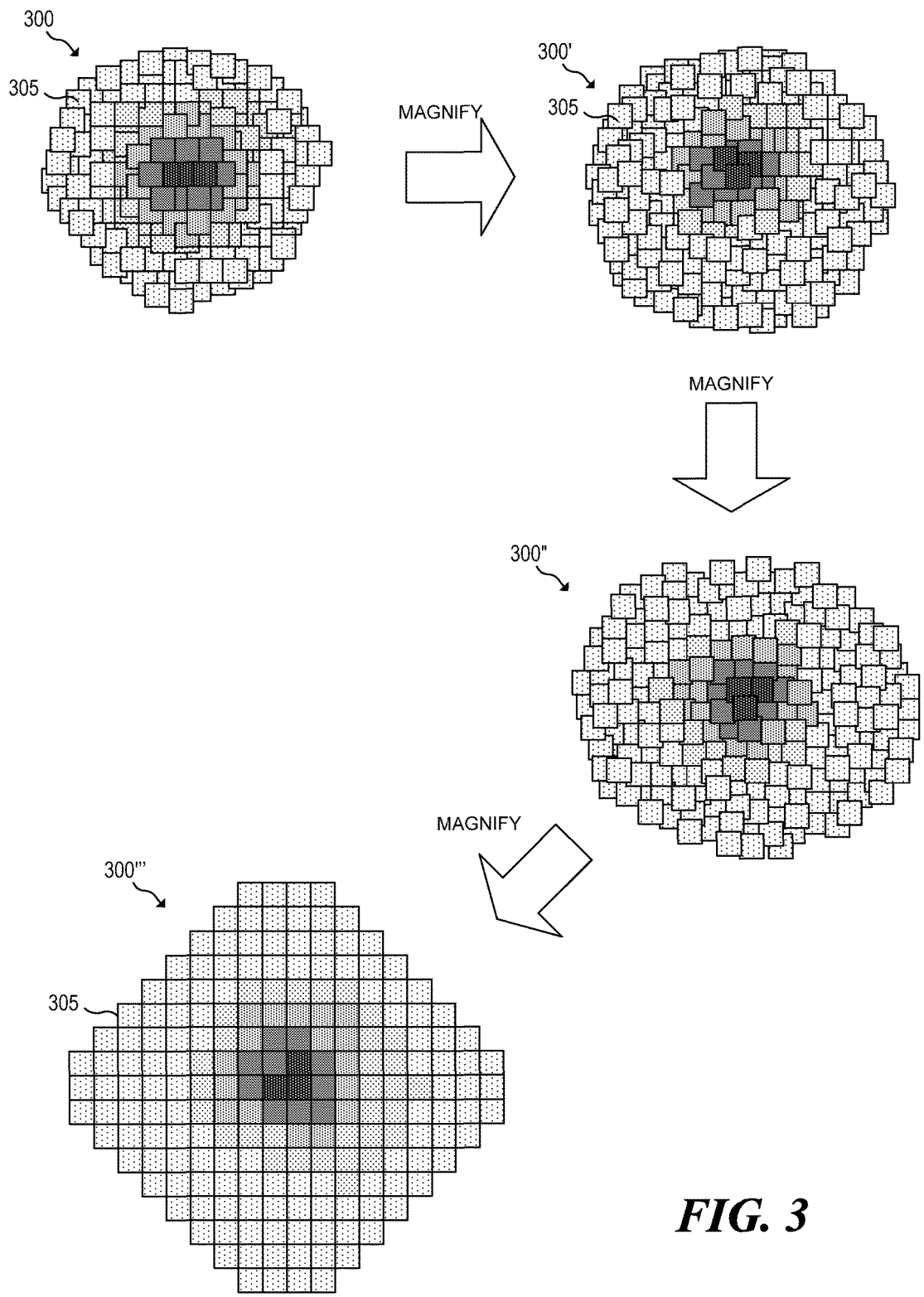
FIG. 3 illustrates an example of different degrees of overlapping patterns of geocoded pixels.

Referring to FIG. 3, a pattern of repositioned geocoded pixels 300 includes a set of geocoded pixels 305 that overlap each other with a certain degree of overlap. Pattern of repositioned geocoded pixels 300 may correspond with a magnification level of a map such that pattern of repositioned geocoded pixels 300 is displayed at the corresponding magnification of the map. A pattern of repositioned geocoded pixels 300' includes a set of geocoded pixels 305 that overlap each other with a degree of overlap that is smaller than the degree of overlap of pattern of repositioned geocoded pixels 300. Pattern of repositioned geocoded pixels 300' may correspond with a magnification level of a map that is larger than the magnification level corresponding to pattern of repositioned geocoded pixels 300. Accordingly, when the map is magnified to the level corresponding to pattern of repositioned geocoded pixels 300', pattern of repositioned geocoded pixels 300' is displayed.

A pattern of repositioned geocoded pixels 300" includes a set of geocoded pixels 305 that overlap each other with a degree of overlap that is smaller than the degree of overlap of pattern of repositioned geocoded pixels 300 and of pattern of repositioned geocoded pixels 300'. Pattern of repositioned geocoded pixels 300" may also correspond with a magnification level of a map that is larger than the magnification level corresponding to pattern of repositioned geocoded pixels 300 and pattern of repositioned geocoded pixels 300'. Accordingly, when the map is magnified to the level corresponding to pattern of repositioned geocoded pixels 300", pattern of repositioned geocoded pixels 300" is displayed.

A pattern of repositioned geocoded pixels 300''' includes a set of geocoded pixels 305 that overlap each other with a degree of overlap that is smaller than the degree of overlap of pattern of repositioned geocoded pixels 300, of pattern of repositioned geocoded pixels 300', and of pattern of repositioned geocoded pixels 300". For example, pattern of repositioned geocoded pixels 300''' may include geocoded pixels that do not overlap each other. Pattern of repositioned geocoded pixels 300''' may also correspond with a magnification level of a map that is larger than the magnification level corresponding to pattern of repositioned geocoded pixels 300, pattern of repositioned geocoded pixels 300', and pattern of repositioned geocoded pixels 300". In this example, pattern of repositioned geocoded pixels 300''' may correspond to the highest level of magnification. Accordingly, when the map is magnified to the highest level, pattern of repositioned geocoded pixels 300" may displayed such that a user may interact with each individual geocoded pixel that is displayed on the map in a non-overlapping pattern.

Pixel select instructions 124 may cause an individual pixel to be selected on the geographic map with the non-overlapping pattern of geocoded pixels. For example, a cluster of visual indicators may be provided in a rural region on the geographic map with the non-overlapping pattern of geocoded pixels. The cluster of visual indicators may indicate an extremely high disease infection rate relative to its surrounding regions and to other rural regions. An analyzer may want to learn more about this area by selecting a pixel in this region that has a visual indicator that identifies a high disease infection rate.

Display value of data point at selected pixel instructions 125 may cause the data point value at the selected pixel to be displayed. The data point value may include the actual rate of infection for the location corresponding to the pixel (i.e., the attribute value). The data point value may also include the location coordinates associated with the pixel. The coordinates for the geocoded pixel may not correspond to the coordinates for the data point value since the geocoded pixel may have been repositioned to generate the pattern of repositioned geocoded pixels. Accordingly, the displayed coordinates may provide the user with the actual location that corresponds to the attribute value for the selected pixel.

Figure 4:
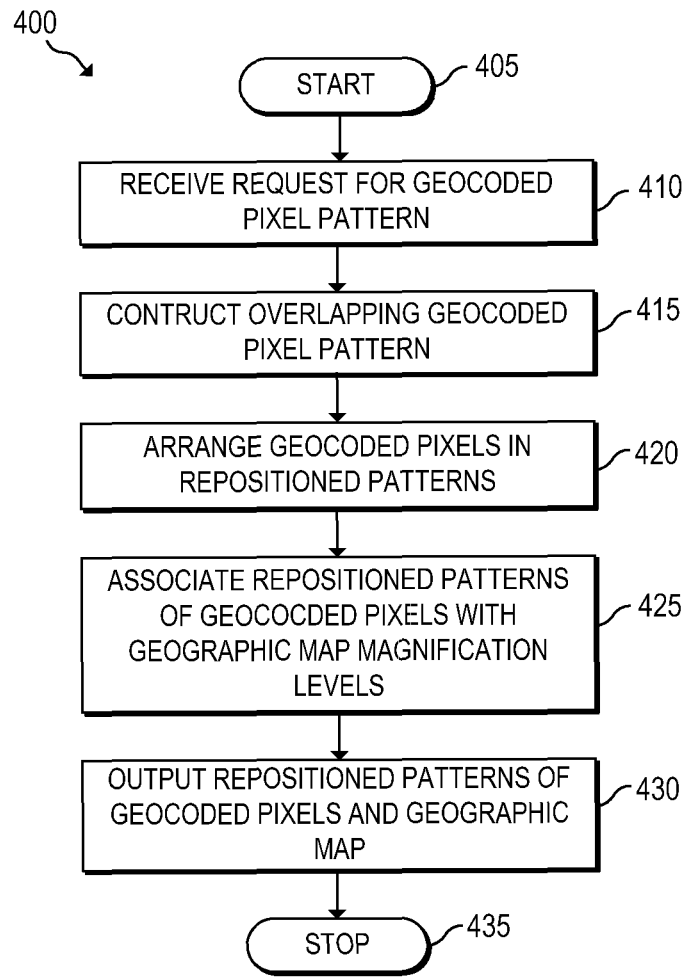
FIG. 4 is a flowchart of an example method for execution by a server computing device for generating a map having different degrees of overlapping patterns of geocoded pixels.

FIG. 4 is a flowchart of an example method 400 for execution by server computing device 160 for providing a map with different degrees of overlapping geocoded pixels. Although execution of method 400 is described below with reference to server computing device 160 of FIG. 1, other suitable devices for execution of method 400 will be apparent to those of skill in the art. Method 400 may be implemented in the form of executable instructions stored on a machine-readable storage medium, such as storage medium 180, and/or in the form of electronic circuitry.

Method 400 may start in block 405 and continue to block 410, where a request is received for a geocoded pixel pattern. A user may request the geocoded pixel pattern to receive data about an attribute that varies depending on geographic location. Method 400 is described with reference to an attribute of annual household income. However, the attribute may be any characteristic of a population that may vary depending on geographic location. Other example attributes may include a presence of disease in a population, consumer spending habits, and level of education. The user may request the geocoded pixel pattern to visualize how the attribute varies at different regions of a geographic area, and to analyze different levels of the geocoded pixel pattern by changing a magnification level of the geographic area.

Next, in block 415, an overlapping pattern of geocoded pixels is constructed. Each pixel to be provided on the geocoded pixel pattern may correspond to at least one data point value. Each pixel may also correspond to particular geographic coordinates. For example, a data point value may identify a particular annual household income where the location of the household is identified using longitudinal and lateral coordinates. The data point values may be retrieved by server computing device 160 from an external network location. For example, the data point values for annual household income may be retrieved from a network location that maintains records of publicly accessible information. In this example, the data point values may be accessed at a network location that may maintain tax return information and census records for an entire population of a country.

The data point values may be converted to geocoded pixels. Each geocoded pixel is positioned on the geocoded pixel pattern at the coordinates included in the corresponding data point value. For example, a pixel is positioned on the geocoded pixel pattern at a location that corresponds to a household provided from the data point value. The location of the household may be identified using longitudinal and lateral coordinates.

Each geocoded pixel may also be assigned a visual indicator which corresponds to a value of the attribute. For example, the visual indicator may correspond to a color that is assigned to the geocoded pixel based on a value of the annual household income for the household. In some implementations, the highest values of annual household income may be assigned the color red, high values of annual household income may be assigned the color yellow, medium values of annual household income may be assigned the color green, low values of annual household income may be assigned the color blue, and the lowest values of annual household income may be assigned the color purple.

In densely populated areas, many households may be located at the same coordinates. For example, many different households may use the same residential address of a large housing development or apartment building. In this case, many of the data points correspond to a same location such that corresponding pixels may overlap each other on the geocoded pixel pattern. If a user were to zoom-in to a specific geographic area, there may still be a high degree of overlap between a large number of pixels. Accordingly, a user may not be able to observe variations in some of the attributes in high density areas because some geocoded pixels that correspond to high values of annual household income may be obscured by a high concentration of geocoded pixels that correspond to low values of annual household income in the same geographic area.

Figure 5:
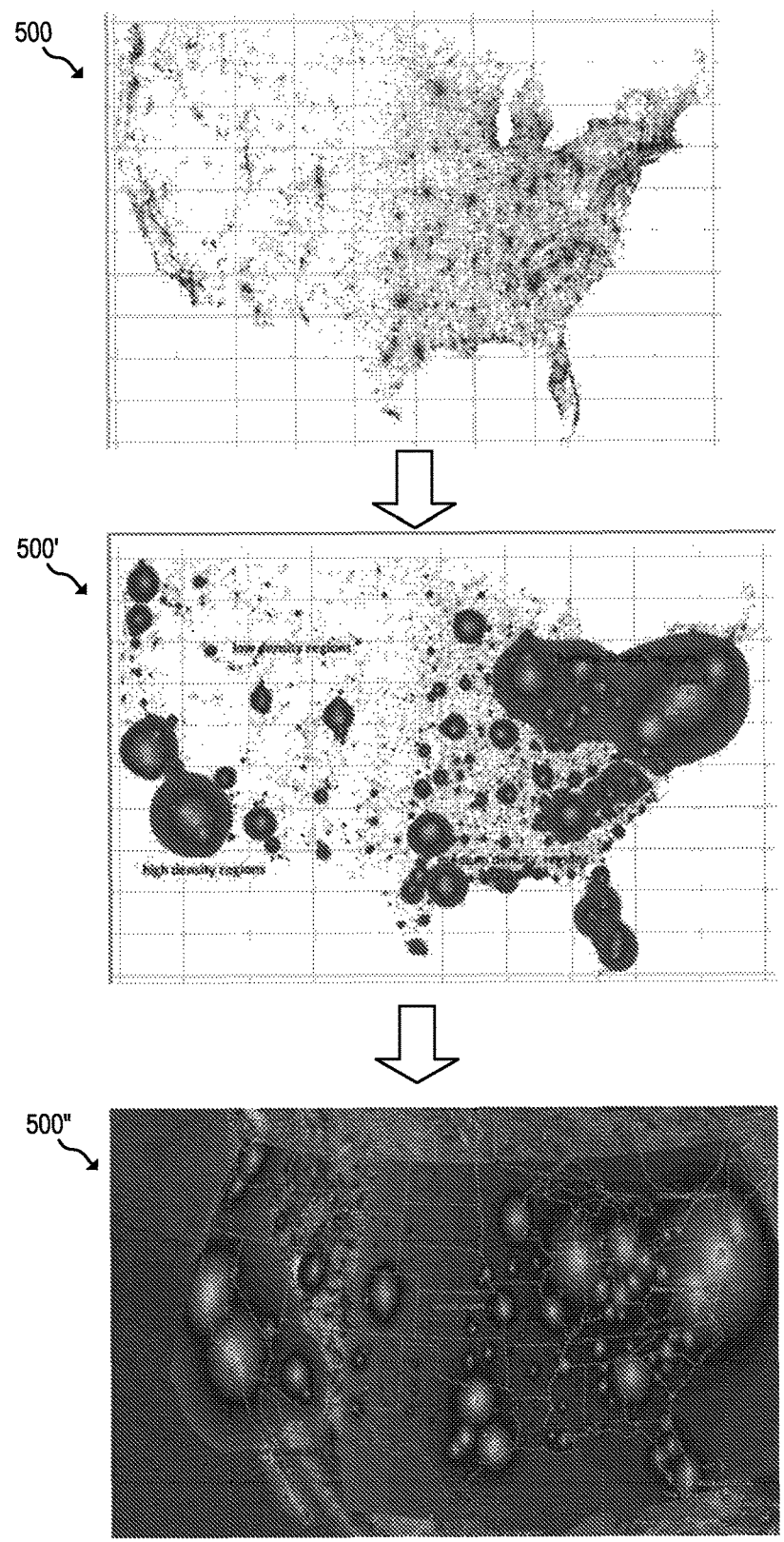
FIG. 5 illustrates an example map including different degrees of overlapping patterns of geocoded pixels.

An example of an overlapping geocoded pixel pattern is illustrated in an upper portion of FIG. 5. Each pixel on a geocoded pixel pattern 500 may represent a data point value corresponding to an attribute and having coordinates. In geocoded pixel pattern 500, the attribute is annual household income. Each coordinate on geocoded pixel pattern 500 may include multiple pixels depending on the density and distribution of the locations of the geocoded pixels and a magnification of the displayed region. The geocoded pixels may be provided with a visual indicator, such as color, to represent a range of data point values, as described above. Since there are many geocoded pixels with a high degree of overlap in densely populated areas, analysts may have difficulty observing an actual distribution of different annual household incomes across a particular geographic region.

In block 420, the overlapping pattern of geocoded pixels is arranged in a pattern of repositioned geocoded pixels having a smaller degree o overlap. Each overlapping pattern of geocoded pixels is arranged according to two attributes: the attribute value of the data points (e.g., annual household income) and the number of data points (e.g., density). To generate a pattern of repositioned geocoded pixels having a smaller degree of overlap, the data point values are sorted according to attribute value. For example, the data point values may be sorted in a list from highest annual household income to lowest annual household income. The geocoded pixel of the data point value with the highest annual household income may be provided at a location on the pattern of repositioned geocoded pixels using the coordinates from the corresponding data point value. This geocoded pixel is provided at coordinates that may be identified as central coordinates. The geocoded pixels of the data point values with the next highest annual household income values are provided on the repositioned geocoded pixel pattern proximate the central coordinates in a generally concentric fashion with a smaller degree of overlap with the geocoded pixels having higher data point values than the original overlapping geocoded pixel pattern. This process continues until the remaining data point values in the sorted list are provided as geocoded pixel values on the geocoded pixel pattern in a concentric fashion around the central coordinates with a smaller degree of overlap than the previously repositioned geocoded pixels.

An example of a pattern of repositioned geocoded pixels is illustrated in a middle portion of FIG. 5. A pattern of repositioned geocoded pixels 500' illustrates that the geocoded pixels are spread out relative to original overlapping geocoded pixel pattern 400. This result is caused by the repositioning of the geocoded pixels relative to the central coordinates based on the attribute value associated with the geocoded pixel. For example, the geocoded pixels that correspond to high values of annual household income are not repositioned far from the coordinates of the corresponding household, while the geocoded pixels for low annual household income may be repositioned at a distance relatively far from the coordinates of the corresponding household.

Accordingly, as shown on pattern of repositioned geocoded pixels 500', the visual indicators associated with high annual household incomes appear to be concentrated in densely populated metropolitan areas, and the visual indicators associated with low annual household incomes appear to be arranged around the outskirts of the densely populated areas. In some cases, the visual indicator for a low annual household income may be positioned at a location that does not correspond to a habitable area. This is because the creation of pattern of repositioned geocoded pixels 500' caused many of the geocoded pixels to be repositioned a large distance from the corresponding location of the household such that these geocoded pixels are provided over bodies of water or at other uninhabitable areas. Multiple patterns of repositioned geocoded pixels may be generated to correspond to different magnification levels of a map.

Next, in block 425, each pattern of geocoded pixels is associated with a different magnification level of a geographic map. The geographic map may be retrieved from a source of geographic maps. In some implementations, server computing device 160 retrieves the geographic map from a remote network location that maintains a repository of different geographic maps. The patterns of repositioned geocoded pixels are then associated with different magnification levels of the geographic map such that a user may be able to view different degrees of overlapping geocoded pixels on the map by changing the magnification level of the map. By transposing the patterns of repositioned geocoded pixels on the map, a user may be identify particular geographic regions on the patterns of repositioned geocoded pixels. An example of a pattern of repositioned geocoded pixels that is transposed onto a geographic map is illustrated as a map 500" in the lower portion of FIG. 5. In this case, a geographic map of the United States is retrieved and the non-overlapping pattern of geocoded pixels representing annual household incomes may be transposed on the geographic map of the United States.

Finally, in block 430, the geographic map and the patterns of repositioned geocoded pixels are output from server computing device 160 to client computing device 100 over network 130. Accordingly, a user may access the geographic map with the patterns of repositioned geocoded pixels at client computing device 100. Method 400 may subsequently proceed to block 435, where method 400 may stop.

Figure 6:
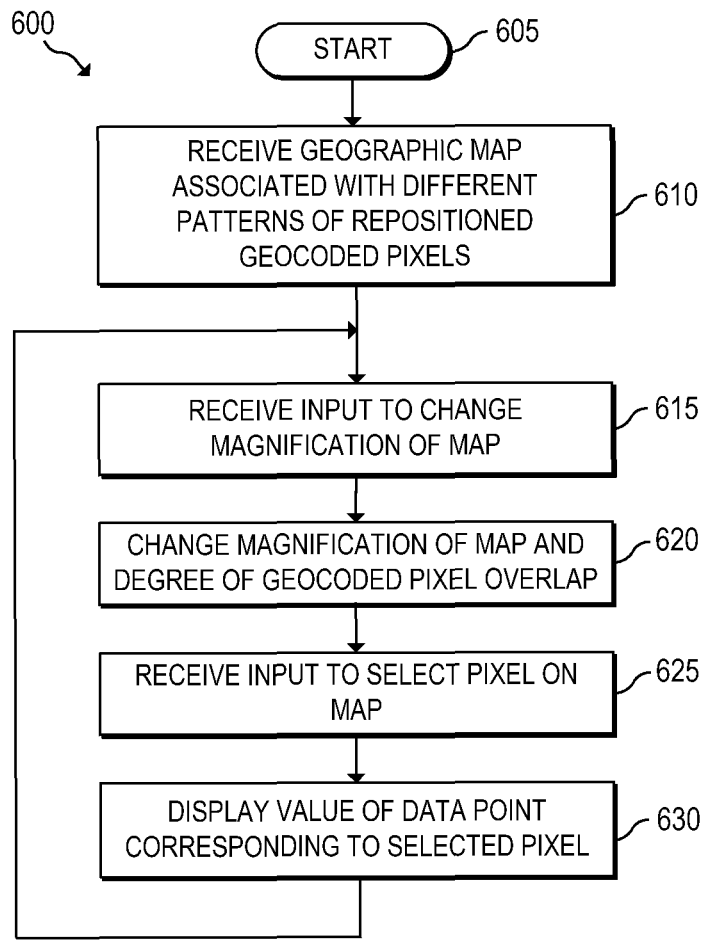
FIG. 6 is a flowchart of an example method for execution by a client computing device for interacting with a map having different degrees overlapping patterns of geocoded pixels.

FIG. 6 is a flowchart of an example method 600 for execution by client computing device 100 for interacting with a map associated with patterns of different degrees of overlapping geocoded pixels. Although execution of method 600 is described below with reference to client computing device 100 of FIG. 1, other suitable devices for execution of method 600 will be apparent to those of skill in the art. Method 600 may be implemented in the form of executable instructions stored on a machine-readable storage medium, such as storage medium 120, and/or in the form of electronic circuitry.

Method 600 may start in block 605 and continue to block 610, where a map associated with different patterns of repositioned geocoded pixels is received at client computing device 100 from server computing device 160 over network 130. The map and the patterns of repositioned geocoded pixels may be received at client computing device 100 in response to a request sent to server computing device 160 from client computing device 100. The patterns of repositioned geocoded pixels may correspond to different magnification levels of the map.

Next, in block 615, client computing device 100 receives an input to change magnification of the map. The different patterns of repositioned geocoded pixels are synchronized with different magnification levels of the map such that a change in magnification results in a change of the degree of overlap between the geocoded pixels. In some implementations, an increase in a magnification level of the map results in a lower degree of overlap between geocoded pixels on the pattern of repositioned geocoded pixels. The user may want to magnify the map in order to observe more closely the geocoded pixels in a specific region. The user may want to further magnify the map to analyze individual data point values at the pixel level. The user may also want to zoom-out from the map top observe different attribute patterns over a large geographic area. In response to the input to change the magnification of the map, at block 620, a magnification of the map is changed and the level of the pattern of repositioned geocoded pixels is also changed due to the synchronization between the magnification level of the map and the different levels of the pattern of repositioned geocoded pixels. Accordingly, the degree of overlap between the geocoded pixels also changes in response to the change in the magnification level of the map.

Figure 7:
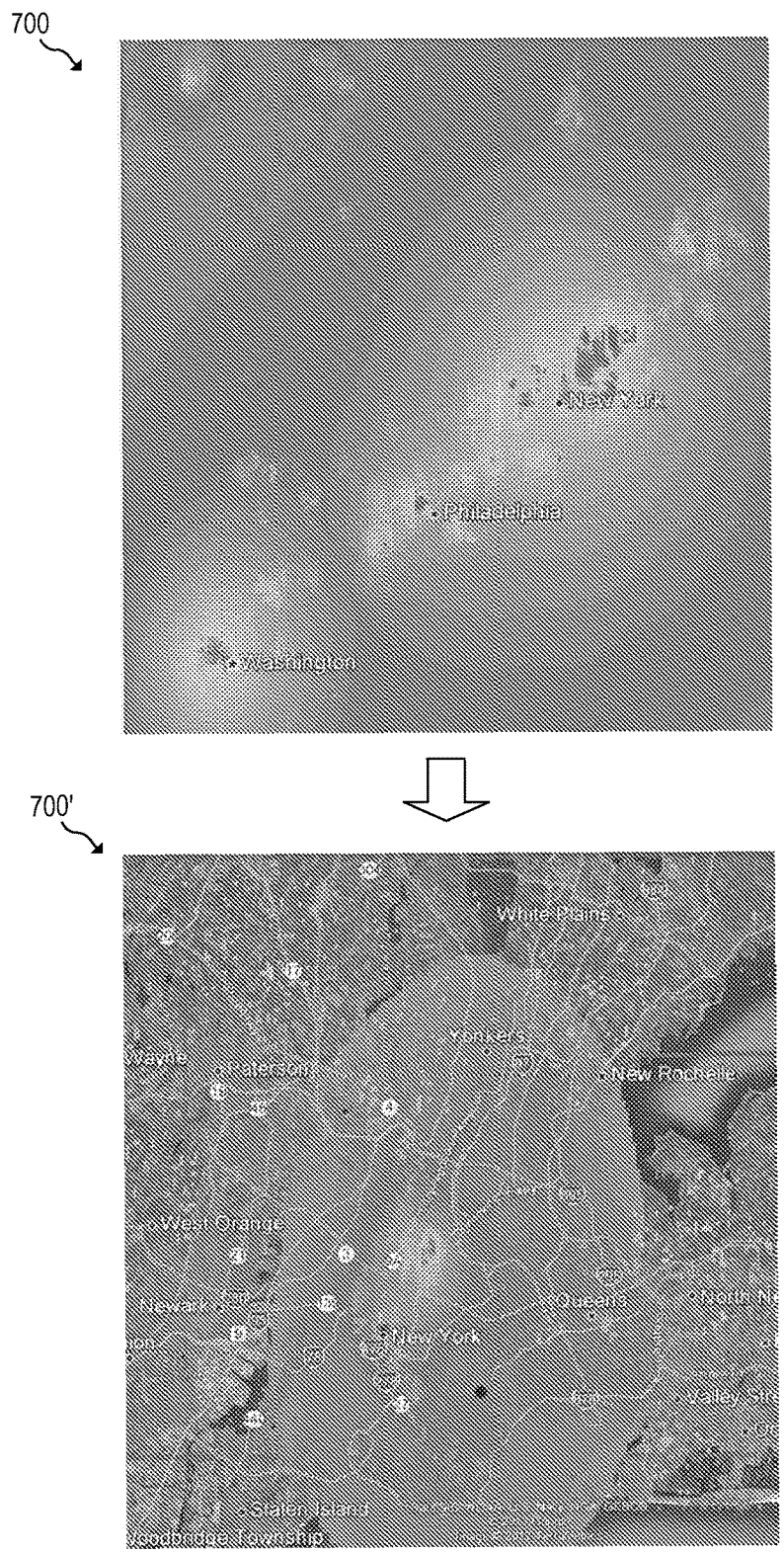
FIG. 7 illustrates an example map including an overlapping pattern of geocoded pixels associated with one magnification level and an example map including an overlapping pattern of geocoded pixels associated with a different magnification level.

As shown in the upper portion of FIG. 7, a map 700 including the pattern of repositioned geocoded pixels may be enlarged from an original map 500" such that a user may observe variations in annual household incomes in a particular region of the northeastern United States. When the user magnifies the map, a level of the pattern of repositioned geocoded pixels also changes to show a more detailed view of a portion of the pattern of geocoded pixels. At the increased magnification level of map 700, a degree of overlap between the geocoded pixels is smaller than the degree of overlap of the geocoded pixels of map 500". By observing map 700, a user may identify that the metropolitan areas of New York City, Philadelphia, and Washington D.C. include a higher density of high annual household incomes than other geographic areas in the northeastern United States.

A user may further increase the magnification of the map to observe another level of the pattern of geocoded pixels having a smaller degree of geocoded pixel overlap. As shown in the lower portion of FIG. 7, a map 700' including the pattern of repositioned geocoded pixels may be enlarged relative to map 700 such that the user may visualize a different level of geocoded pixels corresponding to annual household incomes in the greater New York City area. The increased magnification level of map 700' relative to map 700 causes the degree of overlap between the geocoded pixels to further decrease due to the synchronization between the map magnification levels and the different levels of the patterns of repositioned geocoded pixels.

Figure 8:
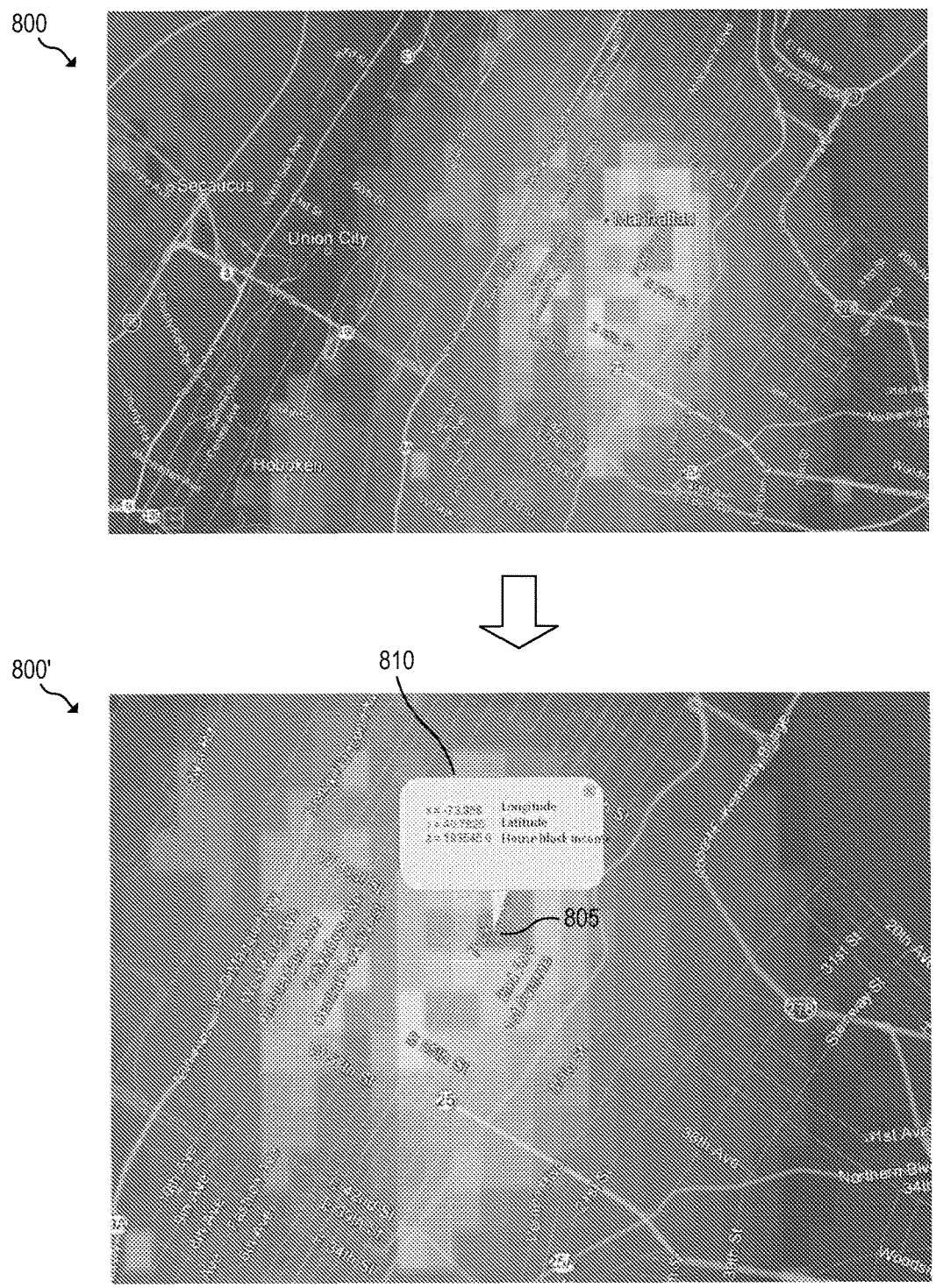
FIG. 8 illustrates an example map of a an overlapping pattern of geocoded pixels associated with one magnification level and an example map including a non-overlapping pattern of geocoded pixels associated with a different magnification level.

The user may continue to increase the magnification of the map to further analyze geocoded pixels having a smaller degree of overlap. As the magnification changes, the level of the pattern of repositioned geocoded pixels may also change accordingly without any other specific action performed on the map. As shown in the upper portion of FIG. 8, a map 800 including the pattern of repositioned geocoded pixels may be enlarged relative to map 700' such that a user may observe variations in annual household incomes in a particular region of New York City. By observing map 800 with a different level of the pattern of repositioned geocoded pixels, a user may identify that the Upper East Side neighborhood of New York City includes a higher density of high annual household incomes than other neighborhoods in the area.

A user may further increase the magnification of the map to view a different level of the pattern of repositioned geocoded pixels. In some implementations, a maximum magnification level corresponds to a level of the pattern of repositioned geocoded pixels that has no overlapping geocoded pixels. As shown in the lower portion of FIG. 8, a map 800' including the non-overlapping pattern of repositioned geocoded pixels may be enlarged relative to map 800 such that the user may analyze specific annual household incomes at the pixel-level in the New York City area. Accordingly, the user may interact with individual geocoded pixels and observe the attribute values and coordinates associated with the data point values of these geocoded pixels.

Next, in block 625, client computing device 100 may receive an input to select a pixel on the map including the non-overlapping pattern of repositioned geocoded pixels. In response, in block 630, client computing device 100 displays a data point value of the selected pixel. As shown in the lower portion of FIG. 8, map 800' including the non-overlapping pattern of repositioned geocoded pixels includes a cursor 805 provided over an individual geocoded pixel. When the pixel is selected, a window 810 may be displayed that includes information about a data point value associated with the selected pixel. In some implementations, window 810 may include an identification of the coordinates for the data point value and an attribute value of the data point.

For example, the coordinates may identify a latitude value and a longitude value associated with the data point value of the selected pixel (e.g., household location), and a value of the attribute (e.g., annual household income) for the household. It is noted that the coordinates that are displayed may not indicate the actual location of the selected pixel on map 800' since the geocoded pixel may have been repositioned during creation of the pattern of repositioned geocoded pixels. Method 600 may subsequently return to block 615, where method 600 may receive an additional user input to change the magnification of the map such that the user may interact with a different level of the pattern of repositioned geocoded pixels.

The foregoing disclosure describes a number of examples for providing a map associated with different levels of a pattern of geocoded pixels. In this manner, the examples disclosed herein enable a user to observe attributes that may vary depending on geographic location and to access individual attribute information at the pixel level.

We claim:

1. A method of generating a map associated with different levels of a pattern of geocoded pixels, the method comprising:
   in response to a request for a map of a distribution of an attribute in a geographic region, obtaining, by a processor of a computing device, a geographic map of the geographic region;
   obtaining, by the processor, data point values of the attribute from a storage, wherein each of the data point values comprises an attribute value and coordinates of a geographic location;

converting, by the processor, the data point values of the attribute into colored pixels, wherein each of the data point values is converted into one of the colored pixels having one of a plurality of colors based on the attribute value of the data point value;

creating, by the processor, a geocoded pixel pattern based on the geographic map of the geographical region by placing each of the colored pixels at a position on the geocoded pixel pattern corresponding to the coordinates of the associated data point value;

rearranging the colored pixels in the geocoded pixel pattern by:

sorting a list of the colored pixels in a descending order based on the attribute values associated with the colored pixels, from a colored pixel having a highest attribute value to a colored pixel having a lowest attribute value, maintaining the colored pixel having the highest attribute value at its position in the geocoded pixel pattern, and repositioning the remaining colored pixels in the sorted list, one by one in the descending order, around the colored pixel having the highest attribute value in a concentric fashion such that the colored pixel having the lowest attribute value is farthest away from the colored pixel having the highest attribute value; and generating the geocoded pixel pattern as a distribution map of the attribute in the geographic region.

2. The method of claim 1, further comprising:
receiving an input to select a particular colored pixel on the distribution map of the attribute; and
displaying the data point value associated with the selected colored pixel.

3. The method of claim 1, further comprising:
parsing the request to identify the geographic region and the attribute in the request.

4. The method of claim 1, wherein the attribute value varies depending on the geographic location.

5. The method of claim 4, wherein the attribute value comprises at least one of annual household income, presence of disease, mortality rate, and an indication of consumer trends.

6. The method of claim 1, wherein the colored pixels have different colors, each of the different colors identifying a range of values for the attribute value of the associated data point value.

7. The method of claim 1, further comprising:
in response to a request of change in a magnification of the geographic map, changing a degree of overlap between the rearranged colored pixels in the geocoded pixel pattern.

8. A non-transitory machine-readable storage medium storing instructions that when executed cause a processor of a computing device to:

in response to a request for a map of a distribution of an attribute in a geographic region, obtain a geographic map of the geographic region, obtain data point values of the attribute from a storage, wherein each of the data point values comprises an attribute value and coordinates of a geographic location, convert the data point values of the attribute into colored pixels, wherein each of the data point values is converted into one of the colored pixels having one of a plurality of colors based on the attribute value of the data point value, create a geocoded pixel pattern based on the geographic map of the geographical region by placing each of the colored pixels at a position on the geocoded pixel pattern corresponding to the coordinates of the associated data point value, rearrange the colored pixels in the geocoded pixel pattern by:

sorting a list of the colored pixels in a descending order based on the attribute values associated with the colored pixels, from a colored pixel having a highest attribute value to a colored pixel having a lowest attribute value, maintaining the colored pixel having the highest attribute value at its position in the geocoded pixel pattern, and repositioning the remaining colored pixels in the sorted list, one by one in the descending order, around the colored pixel having the highest attribute value in a concentric fashion such that the colored pixel having the lowest attribute value is farthest away from the colored pixel having the highest attribute value, and generate the geocoded pixel pattern as a distribution map of the attribute in the geographic region.

9. The non-transitory machine-readable storage medium of claim 8, wherein the color of each colored pixel identifies a range of values for the attribute value of the data point value associated with the colored pixel.

10. The non-transitory machine-readable storage medium of claim 8, wherein the instructions are to cause the processor to:
receive an input to select a particular colored pixel on the distribution map of the attribute; and
display the data point value associated with the selected colored pixel.

11. The non-transitory machine-readable storage medium of claim 8, wherein the instructions are to cause the processor to:
parse the request to identify the geographic region and the attribute in the request.

12. The non-transitory machine-readable storage medium of claim 8, wherein, in response to a request of change in a magnification of the geographic map, the instructions are to cause the processor to change a degree of overlap between the rearranged colored pixels in the geocoded pixel pattern.

13. A computing device comprising:
a processor; and
a memory storing instructions that when executed cause the processor to:
obtain a geographic map of a geographic region,
obtain data point values of an attribute from a storage, wherein each of the data point values comprises an attribute value and coordinates of a geographic location,
convert the data point values of the attribute into colored pixels,
wherein the data point values is converted into one of the colored pixels having one of a plurality of colors based on the attribute value of the data point value,
create a pattern of geocoded pixels based on the geographic map of the geographical region by placing each of the colored pixels at a position on the pattern corresponding to the coordinates of the associated data point value,
rearrange the colored pixels in the geocoded pixel pattern by:
sorting a list of the colored pixels in a descending order based on the attribute values associated with the colored pixels, from a colored pixel having a highest attribute value to a colored pixel having a lowest attribute value, maintaining the colored pixel having the highest attribute value at its position in the geocoded pixel pattern, and repositioning the remaining colored pixels in the sorted list, one by one in the descending order, around the colored pixel having the highest attribute value in a concentric fashion such that the colored pixel having the lowest attribute value is farthest away from the colored pixel having the highest attribute value, and generate the geocoded pixel pattern as a distribution map of the attribute in the geographic region.

14. The computing device of claim 13, wherein the instructions are to cause the processor to:

receive an input to select a particular colored pixel on the pattern of geocoded pixels; and display the data point value associated with the selected colored pixel.

15. The computing device of claim 13, wherein the attribute value varies depending on the geographic location.

16. The computing device of claim 13, wherein the attribute value comprises at least one of annual household income, presence of disease, mortality rate, and an indication of consumer trends.

17. The computing device of claim 13, wherein the colored pixels have different colors, each of the different colors identifying a range of values for the attribute value of the associated data point value.

18. The computing device of claim 13, wherein, prior to obtaining the geographic map and the data point values of the attribute, the processor is to:

receive a request for a map of a distribution of the attribute in the geographic region; and parse the request to identify the geographic region and the attribute in the request.

19. The computing device of claim 13, wherein, in response to a request of change in a magnification of the geographic map, the instructions are to cause the processor to change a degree of overlap between the rearranged colored pixels in the geocoded pixel pattern.

* * * * *